US008433069B2

(12) United States Patent  (10) Patent No.: US 8,433,069 B2
Noda  (45) Date of Patent: Apr. 30, 2013

(54) SOFTWARE DEFINED RADIO DEVICE, AND METHOD FOR RENEWING SOFTWARE, AND SOFTWARE DEFINED RADIO SYSTEM

(75) Inventor: Mie Noda, Osaka (JP)

(73) Assignee: NEC System Technologies, Ltd., Osaka (JP)

( * ) Notice: Subject to any disclaimer, the term of this patent is extended or adjusted under 35 U.S.C. 154(b) by 1224 days.

(21) Appl. No.: 12/184,807

(22) Filed: Aug. 1, 2008

(65) Prior Publication Data

US 2009/0279699 A1  Nov. 12, 2009

(30) Foreign Application Priority Data

Aug. 1, 2007  (JP) .................................. 2007-201272

(51) Int. Cl.
*H04L 29/06* (2006.01)
(52) U.S. Cl.
USPC ........... 380/260; 380/259; 380/270; 380/274; 713/189; 713/190
(58) Field of Classification Search .................. 380/259, 380/260, 270, 274; 713/170, 176, 189, 190
See application file for complete search history.

(56) References Cited

U.S. PATENT DOCUMENTS

2006/0161750 A1* 7/2006 Perkins et al. ................. 711/164
2008/0212771 A1* 9/2008 Hauser ............................ 380/44

FOREIGN PATENT DOCUMENTS

| JP | 10341223 A | 12/1998 |
|----|------------|---------|
| JP | 2001237818 A | 8/2001 |
| JP | 2002507307 A | 3/2002 |
| JP | 2003223235 A | 8/2003 |
| JP | 2003304235 A | 10/2003 |
| JP | 2004213339 A | 7/2004 |
| JP | 2005269128 A | 9/2005 |
| JP | 2006238307 A | 9/2006 |
| JP | 2007181018 A | 7/2007 |

OTHER PUBLICATIONS

Japanese Office Action for JP 2007-201272 dated Jul. 7, 2009.

* cited by examiner

*Primary Examiner* — Justin T Darrow

(57) ABSTRACT

A software defined radio device and a download server store a plurality of common keys in common key data. The download server arbitrarily determines a common key from the common key data and conveys information identifying the common key to be used to the software defined radio device. An authenticator of the software defined radio device identifies a common key from the common key data using the information identifying the common key, authenticates using the common key, and performs subsequent communications using the common key. When sending software, a hash value is attached for confirming the security. A device ID of the software defined radio device is also attached to data for confirming which software defined radio device receives the software. The software is securely downloaded by a common key encryption having smaller processing requirements than those of a public key encryption.

12 Claims, 13 Drawing Sheets

| NUMBER | COMMON KEY |
|--------|------------|
| 1 | Ka |
| 2 | Kb |
| 3 | Kc |
| ... | ... |
|  |  |

SOFTWARE DEFINED RADIO DEVICE, AND METHOD FOR RENEWING SOFTWARE, AND SOFTWARE DEFINED RADIO SYSTEM

INCORPORATION BY REFERENCE

This application is based upon and claims the benefit of priority from Japanese Patent Application No. 2007-201272 filed on Aug. 1, 2007 the disclosure of which is incorporated herein in its entirety by reference.

BACKGROUND OF THE INVENTION

1. Field of the Invention

The present invention relates to a software defined radio device having a function modifiable by a software modification, and a method for renewing software for downloading software and renewing a function of a software defined radio device, and a software defined radio system for providing software to a software defined radio device.

2. Description of the Related Art

A software defined radio device (SDR: Software Defined Radio) includes a signal processor such as a FPGA (Field Programmable Gate Array) and a DSP (Digital Signal Processor) and is configured to realize wireless communication function corresponding to various communication methods by changing the installed software. Software defined radio devices require preventive measures due to the risk of improper use such as transmissions of unlawful radio waves, disturbances such as radio wave interference, and malfunction of the device, etc. in the case where improper software or altered software not authorized by the device or its owner is installed.

Therefore, it is necessary to enable a download of unaltered software only by a software defined radio device authorized by the software provider. Furthermore, it is necessary to maintain the confidentiality of the content of the software from third parties. In other words, it is necessary to provide security (confirmation via a communication channel of being unaltered), validity (confirmation of a communication entity as being valid), and confidentiality (being unreadable even when intercepted).

Technology for correctly downloading software by a software defined radio device disclosed hitherto includes, for example, "Software Defined Wireless Device and Method for Controlling the Same" (see: Japanese Published Unexamined Patent Application No. 2004-213339) and "Wireless Communication Device, and Method for Program Downloading, and Computer Program" (see: Japanese Published Unexamined Patent Application No. 2003-304235).

Regarding the guarantee of the validity of the software by these technologies, a distributor distributes an electronic signature attached to the software by public key encryption; the software defined radio device at a receiving end verifies the electronic signature; and thereby the validity of the software is confirmed. Furthermore, Japanese Published Unexamined Patent Application No. 2003-304235 discusses technology for switching among the use of hash functions, keys, encryption methods, and the like to improve the validity and concealability of the software.

As an example of technology for maintaining the confidentiality of a communication, Japanese Published Unexamined Patent Application No. 2005-269128 discusses technology for selecting one common key for each communication from a plurality of common keys, communicating only an index thereof, encrypting the data transmission, and decrypting the data transmission. Furthermore, the technology discussed in Japanese Published Unexamined Patent Application No. 2005-269128 confirms the data as being unaltered by using a hash value.

Additionally, in the case where encrypted communication is performed between devices, hitherto technology includes a relay device for decrypting encrypted data and then transmitting after encrypting with a separate common key (see: Japanese Published Unexamined Patent Application No. H10-341223). Furthermore, this Patent Reference discusses the use of a combination of a public key and a private key in one of the communication intervals.

However, the communication method of the software defined radio device is changed, and therefore during the software download, it is preferable for the software defined radio device to perform the verification of the validity using a small calculation amount and in a short period of time.

The technologies discussed in the patent references recited above verify the validity using an electronic signature of a public key encryption, but generally, the processing required by a public key encryption is more than that of a common key encryption. For the constrained processing capacity of portable wireless devices, embedded devices, and the like, a tradeoff unfortunately occurs between the processing time and the security of the download.

Furthermore, in light of the limited memory capacity of software defined radio devices, the software data of all of the corresponding communication methods cannot be stored in the software defined radio device. In such a case, it is necessary to frequently interchange the software data. Therefore, a configuration providing a high speed verification of the validity of downloaded software is required. However, simply replacing a public key encryption with a common key encryption is unfortunately insufficient for protecting the security once the common key is compromised.

In light the problems recited above, the present invention is directed to provide: a software defined radio device for maintaining the security of software downloads while reducing the amount of processing necessary for verifying the validity of the downloaded software and performing the verification at high speed; a method for renewing software of the software defined radio device; and a software defined radio system.

SUMMARY OF THE INVENTION

To achieve the objects recited above, a software defined radio device according to a first aspect of the present invention comprises:
  a storage unit for storing an identification code of a device itself and a plurality of common keys for encrypting data and performing mutual communications with a communication entity;
  a download initiation unit for sending arbitrarily selected data to the communication entity;
  a common key identification unit for identifying one common key from the plurality of common keys based on data received from the communication entity;
  a verification unit for calculating a hash value with a hash function from data made by encrypting the arbitrarily selected data with a common key identified by the common key identification unit;
  a download request unit for encrypting data including the identification code with a common key identified by the common key identification unit and sending the encrypted data to the communication entity in the case where a hash value calculated by the verification unit matches a hash value included in data received from the communication entity;

a decryption unit for decrypting download data received from the communication entity with a common key identified by the common key identification unit;

a confirmation unit for calculating a hash value with a hash function from data decrypted by the decryption unit in the case where an identification code included in the decrypted data matches the identification code stored by the storage unit; and a modification unit for using software data included in the decrypted data to modify a communication function in the case where a hash value included in the decrypted data matches a hash value calculated by the confirmation unit.

A method for renewing software of a software defined radio device according to a second aspect of the present invention is characterized in that:

a software defined radio device comprises a download initiation step for sending initiation data including arbitrarily selected data to a communication entity;

the communication entity receiving the initiation data comprises
 a selection step for selecting one common key from a plurality of common keys for encrypting data and performing mutual communications and
 a common key designation step for sending a hash value calculated with a hash function from data made by encrypting the arbitrarily selected data included in the initiation data received from the software defined radio device with the selected common key and data for identifying a common key selected in the selection step to the software defined radio device that sent the initiation data;

the software defined radio device comprises
 a common key identification step for identifying one common key from the plurality of common keys based on data received from the communication entity,
 an authentication step for calculating a hash value with a hash function from data made by encrypting the arbitrarily selected data with a common key identified in the common key identification step, and
 a download request step for sending identification data made by encrypting data including an identification code of the software defined radio device itself with a common key identified in the common key identification step to the communication entity in the case where a hash value calculated in the authentication step matches a hash value included in data received from the communication entity;

the communication entity comprises a download step for sending download data made by encrypting, with the selected common key, software data requested by the software defined radio device, a hash value calculated with a hash function from the software data, and an identification code made by decrypting identification data received from the software defined radio device with the selected common key to the software defined radio device in the case where the identification code made by decrypting identification data matches one of a plurality of preregistered identification codes; and the software defined radio device comprises
 a decryption step for decrypting the download data received from the communication entity with a common key identified in the common key identification step,
 a confirmation step for calculating a hash value with a hash function from data decrypted in the decryption step in the case where an identification code included in the decrypted data matches the identification code of the software defined radio device, and
 a modification step for using software data included in the decrypted data to modify a communication function in the case where a hash value included in the decrypted data matches a hash value calculated in the confirmation step.

A method for renewing software of a software defined radio device according to a third aspect of the present invention is characterized in that:

a software defined radio device comprises a download initiation step for sending initiation data including arbitrarily selected data to a communication entity;

the communication entity receiving the initiation data comprises
 a selection step for selecting one common key from a plurality of common keys for encrypting data and performing mutual communications and
 a common key designation step for sending a hash value calculated with a hash function from data made by encrypting the arbitrarily selected data included in the initiation data received from the software defined radio device with the selected common key and data for identifying a common key selected in the selection step to the software defined radio device that sent the initiation data;

the software defined radio device comprises
 a common key identification step for identifying one common key from the plurality of common keys based on data received from the communication entity,
 a verification step for calculating a hash value with a hash function from data made by encrypting the arbitrarily selected data with a common key identified in the common key identification step, and
 a download request step for sending identification data made by encrypting, with a common key identified in the common key identification step, data made by encrypting data including an identification code of the software defined radio device itself with a second common key separate from the plurality of common keys to the communication entity in the case where a hash value calculated in the verification step matches a hash value included in data received from the communication entity;

the communication entity comprises a download request relay step for sending identification relay data made by decrypting, with a public key of a download server storing software data of the software defined radio device, data made by decrypting identification data received from the software defined radio device with the selected common key to the download server;

the download server comprises a relay download step for sending data made by attaching, with a private key, an electronic signature to download source data made by encrypting, with the second common key, software data requested by the software defined radio device, a hash value calculated with a hash function from the software data, and an identification code made by decrypting, with the second common key, data made by decrypting identification relay data received from the communication entity with the private key to the communication entity in the case where the identification code matches one of a plurality of preregistered identification codes;

the communication entity comprises a download step for verifying an electronic signature included in data received from the download server with a public key of the download server and sending download data made by encrypting the download source data with the selected common key to the software defined radio device in the case where the verification determines that data received from the download server is correct; and the software defined radio device comprises
- a decryption step for decrypting, with the second common key, data made by decrypting the download data received from the communication entity with a common key identified in the common key identification step,
- a confirmation step for calculating a hash value with a hash function from data decrypted in the decryption step in the case where an identification code included in the decrypted data matches the identification code of the software defined radio device, and
- a modification step for using software data included in the decrypted data to modify a communication function in the case where a hash value included in the decrypted data matches a hash value calculated in the confirmation step.

A software defined radio system according to a fourth aspect of the present invention includes a software defined radio device having a communication function modifiable by a software modification and a download server for storing software data of the software defined radio device, and is characterized in that:

the software defined radio device comprises
- a storage unit for storing an identification code of the device itself and a plurality of common keys for encrypting data and performing mutual communications with the download server,
- a download initiation unit for sending initiation data including arbitrarily selected data to the download server,
- a common key identification unit for identifying one common key from the plurality of common keys based on data received from the download server,
- a verification unit for calculating a hash value with a hash function from data made by encrypting the arbitrarily selected data with a common key identified by the common key identification unit,
- a download request unit for sending identification data made by encrypting data including the identification code with a common key identified by the common key identification unit to the download server in the case where a hash value calculated by the verification unit matches a hash value included in data received from the download server,
- a decryption unit for decrypting download data received from the download server with a common key identified by the common key identification unit,
- a confirmation unit for calculating a hash value with a hash function from data decrypted by the decryption unit in the case where an identification code included in the decrypted data matches the identification code stored by the storage unit, and
- a modification unit for using software data included in the decrypted data to modify a communication function in the case where a hash value included in the decrypted data matches a hash value calculated by the confirmation unit; and the download server comprises
- a selection unit for selecting one common key from the plurality of common keys for encrypting data and performing mutual communications with the software defined radio device,
- a common key designation unit for sending a hash value calculated with a hash function from data made by encrypting the data arbitrarily selected by the software defined radio device and received from the software defined radio device with the selected common key and data for identifying a common key selected by the selection unit to the software defined radio device that sent the initiation data, and
- a download unit for sending download data made by encrypting, with the selected common key, software data requested by the software defined radio device, a hash value calculated with a hash function from the software data, and an identification code made by decrypting identification data received from the software defined radio device with the selected common key to the software defined radio device in the case where the identification code matches one of a plurality of preregistered identification codes.

A software defined radio system according to a fifth aspect of the present invention includes a software defined radio device having a communication function modifiable by a software modification, a download server for storing software data of the software defined radio device, and a terminal device for relaying communications between the software defined radio device and the download server, and is characterized in that:

the software defined radio device comprises
- a storage unit for storing an identification code of the device itself and a plurality of common keys for encrypting data and performing mutual communications with the download server and
- a download initiation unit for sending initiation data including arbitrarily selected data to the download server;

the terminal device comprises
- a selection unit for selecting one common key from the plurality of common keys for encrypting data and performing mutual communications with the software defined radio device and
- a common key designation unit for sending a hash value calculated with a hash function from data made by encrypting the data arbitrarily selected by the software defined radio device and received from the software defined radio device with the selected common key and data for identifying a common key selected by the selection unit to the software defined radio device that sent the initiation data;

the software defined radio device comprises
- a common key identification unit for identifying one common key from the plurality of common keys based on data received from the terminal device,
- a verification unit for calculating a hash value with a hash function from data made by encrypting the arbitrarily selected data with a common key identified by the common key identification unit, and
- a download request unit for sending identification data made by encrypting, with a common key identified by the common key identification unit, data made by encrypting data including the identification code with a second common key separate from the plurality of common keys to the terminal device in the case where a hash value calculated by the verification unit matches a hash value included in data received from the terminal device;

the terminal device comprises a download request relay unit for sending identification relay data made by decrypting, with a public key of the download server, data made by decrypting identification data received from the software defined radio device with the selected common key to the download server;

the download server comprises a relay download unit for sending data made by attaching, with a private key, an electronic signature to download source data made by encrypting, with a second common key separate from the plurality of common keys, software data requested by the software defined radio device, a hash value calculated with a hash function from the software data, and an identification code made by decrypting, with the second common key, data made by decrypting identification relay data received from the terminal device with the private key to the communication entity in the case where the identification code matches one of a plurality of preregistered identification codes;

the terminal device further comprises a download unit for verifying an electronic signature included in data received from the download server with a public key of the download server and sending download data made by encrypting the download source data with the selected common key to the software defined radio device in the case where the verification determines that data received from the download server is correct; and the software defined radio device further comprises
a decryption unit for decrypting, with the second common key, data made by decrypting the download data received from the terminal device with a common key identified by the common key identification unit,
a confirmation unit for calculating a hash value with a hash function from data decrypted by the decryption unit in the case where an identification code included in the decrypted data matches the identification code of the software defined radio device, and
a modification unit for using software data included in the decrypted data to modify a communication function in the case where a hash value included in the decrypted data matches a hash value calculated by the confirmation unit.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

[First Exemplary Embodiment]

Figure 1:
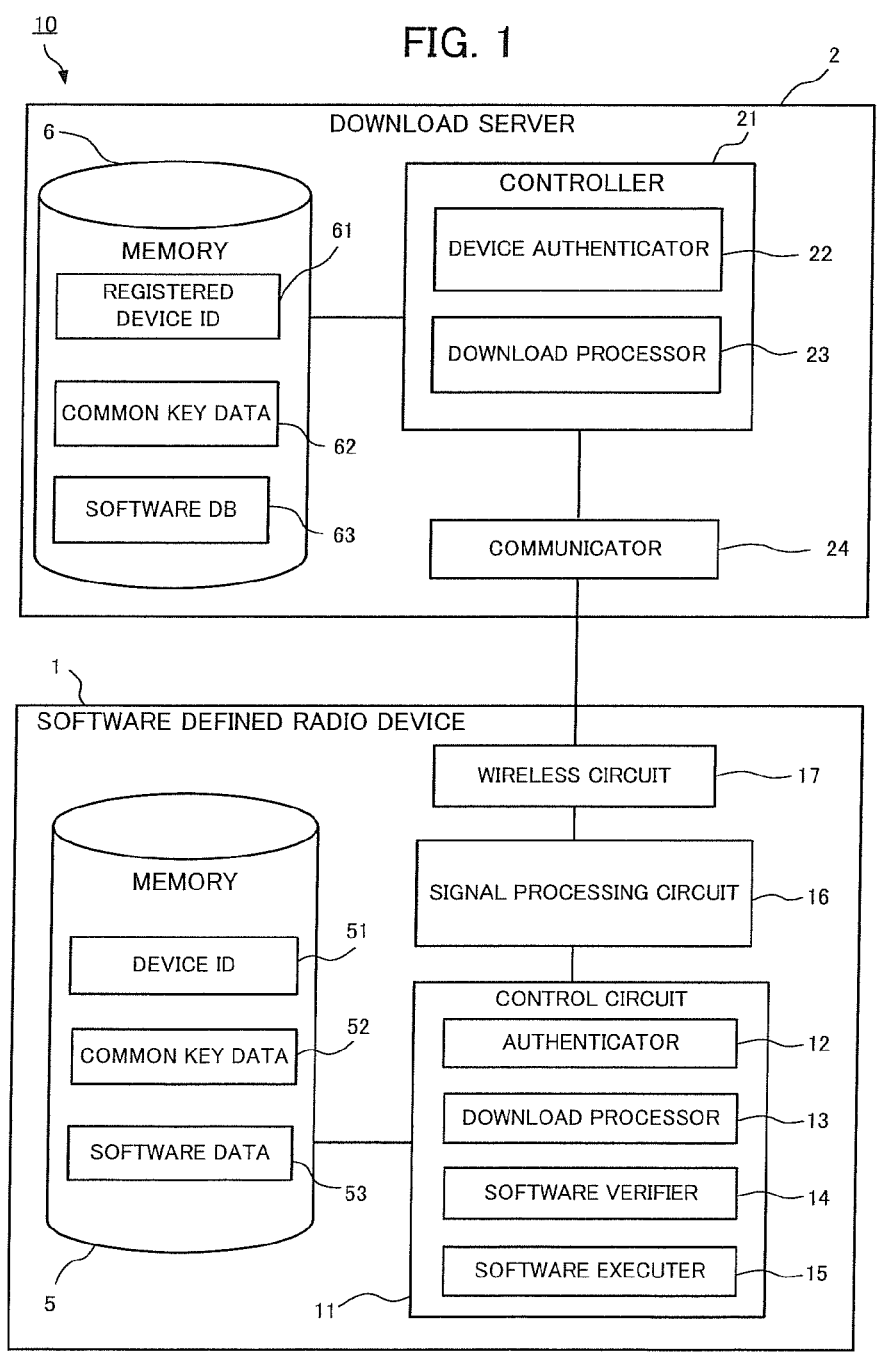
FIG. 1 is a block diagram illustrating an example of a configuration of a software defined radio system according to a first exemplary embodiment of the present invention.

Now, a first exemplary embodiment of the present invention will be described in detail with reference to the drawings. In the drawings, the same reference numerals are used for similar or corresponding components.

FIG. 1 is a block diagram illustrating an example of a configuration of a software defined radio system according to the first exemplary embodiment of the present invention. The software defined radio system 10 illustrated in FIG. 1 includes a software defined radio device 1 capable of modifying communication function by installing different software and a download server 2 for supplying software to the software defined radio device 1. The software defined radio system 10 may include multiple software defined radio devices 1 having similar configurations. Only one software defined radio device 1 is illustrated in FIG. 1 for clarity of illustration.

The software defined radio device 1 includes a control circuit 11, a signal processing circuit 16, a wireless circuit 17, and a memory 5. The control circuit 11 may include a CPU, a main storage device, an input/output device, and the like, and executes a program loaded into the main storage device and downloads software data for realizing the wireless communication function.

The signal processing circuit 16 may include devices having modifiable logic configurations such as a FPGA (Field Programmable Gate Array) and a DSP (Digital Signal Processor). The signal processing circuit 16 may realize the wireless communication function by executing software data that is downloaded by the software defined radio device 1 and programmed into an FPGA or loaded into a DSP.

The wireless circuit 17 may include an antenna, a RF (radio frequency) circuit, an AD/DA converter, and the like. The wireless circuit 17 sends and receives data to and from a communication entity by emitting modulated data as radio waves and demodulated data captured as radio waves. A network is omitted from FIG. 1 for ease of understanding, but the software defined radio device 1 may, for example, communicate with the download server 2 by connecting to a communication network via a wireless base station.

The memory 5 may include memory devices such as tamper resistant devices (devices having functions for preventing improper access and alteration), and flash memory typified by SD memory cards. The memory 5 stores, for example, a device ID 51, common key data 52, and software data 53. The device ID 51 is a unique identification symbol allotted to the software defined radio device 1 of the software defined radio system 10. The device ID 51 may be encrypted in advance using a common key included in the common key data 52.

Figure 2:
FIG. 2 illustrates an example of common key data.

The common key data 52 is a database including a plurality of predetermined common keys for performing authentication of the download server 2 and encrypted communication, and numbers or reference numerals coupled to each of the common keys for identification. FIG. 2 illustrates an example of the common key data 52. The common key data 52 may include, for example, common keys Ka, Kb, Kc, etc. and reference numbers for identifying each of the common keys.

The software data 53 is used to program the signal processing circuit 16 as recited above for realizing the wireless communication function. The software data 53 may not always be stored in the memory 5, for example, at the time of device shipment, etc.

The control circuit 11 includes an authenticator 12, a download processor 13, a software verifier 14, and a software executer 15. The control circuit 11 may include a versatile or a dedicated logic circuit. For example, the logic circuit may realize processing such as encryption and decryption or calculation of a hash value with a hash function.

The authenticator 12 sends initiation data including arbitrary data such as a generated random number to the download server 2 and receives authentication data from the download server 2. The authenticator 12 identifies a common key A with a key parameter included in the authentication data by searching the common key data 52 stored in the memory 5. Then, the authenticator 12 encrypts the arbitrary data sent to the download server 2 with the identified common key A, calculates a hash value with a predetermined hash function from the encrypted arbitrary data, and compares the calculated hash value with a hash value included in the authentication data. In the case where the two hash values match, the software defined radio device 1 determines the communication entity that sent the authentication data to be a valid download server 2.

In the case where the download server 2 is determined to be a valid communication entity, the download processor 13 sends a download request including a device ID encrypted with the common key A to the download server 2. The download request includes information such as the device ID and information for identifying the software data to be downloaded from the download server 2. Then, the download processor 13 receives download data including the software data from the download server 2.

The software verifier 14 decrypts the download data with the common key A. The software verifier 14 determines software included in the download data to be correct software in the case where the device ID included in the decrypted data matches the device ID 51 stored in the memory 5. Then, the software verifier 14 calculates a hash value with a predetermined hash function from the decrypted software and compares the calculated hash value to a hash value included in the decrypted data. In the case where the two hash values match, the software verifier 14 determines that the software is legitimate without alteration or other corruption.

In the case where the downloaded software is determined to be legitimate without alteration or other corruption, the software executer 15 executes the software and the configuration of the signal processing circuit 16 is modified thereby.

On the other hand, the download server 2 includes a controller 21, a communicator 24, and a memory 6. The controller 21 may include devices such as a CPU, a main storage device, and an input/output device; execute a program loaded into the main storage device; and perform various processing for sending software to the software defined radio device 1. The communicator 24 communicates with the wireless circuit 17 of the software defined radio device 1 and sends and receives data.

The memory 6 may include non-volatile memory such as flash memory, hard disk drive media, DVD-RAM (Digital Versatile Disc-Random Access Memory), and DVD-RW (Digital Versatile Disc-Rewritable) and stores a registered device ID 61, common key data 62, and a software DB (Database) 63.

For the software defined radio system 10, the device ID of the software defined radio device 1, recognized to be a legitimate device is stored in the registered device ID 61. For the software defined radio system 10, software downloads are permitted for a software defined radio device 1 having its corresponding device ID stored in the registered device ID 61. A software defined radio device 1 having no corresponding device ID stored in the registered device ID 61 is not permitted to download software.

The common key data 62 is a database including a plurality of predetermined common keys for performing verification of the software defined radio device 1 and encrypted communication, and a number or reference numeral coupled to each of the common keys for identification. The common key data 62 may be similar to the common key data 52 of the software defined radio device 1, or may have one or more portions that are similar thereto. The common key data 62 of the download server 2 may include differing combinations for each of the software defined radio devices 1 or each group of multiple software defined radio devices 1.

One or more software components may be stored in the software DB 63 for realizing wireless communication function of the software defined radio device 1. Downloadable software is coupled to a device ID and stored in the software DB 63 for each of the software defined radio devices 1 or each group of multiple software defined radio devices 1. Furthermore, the hash value calculated with the hash function from data of the software may be stored together with the software. The contents stored in the software DB 63 may be similar to that of the registered device ID 61. Information coupled to the downloadable software may include information having a worth equivalent to or exceeding that of the software itself.

The controller 21 includes a device authenticator 22 and a download processor 23. The device authenticator 22 and the download processor 23 may be realized by devices of the controller 21 such as the CPU, the main storage device, and the input/output device.

The device authenticator 22 receives the initiation data from the software defined radio device 1; creates, for example, a random number; uses the random number to select any common key A for encrypting data; and determines a key parameter (number) corresponding to the common key A. The device authenticator 22 encrypts the arbitrary data included in the initiation data with the selected common key A and calculates a hash value with a predetermined hash function from the encrypted data. Authentication data including the hash value and the key parameter corresponding to the common key A is sent to the software defined radio device 1 that sent the initiation data.

The download processor 23 receives a download request from the software defined radio device 1, whereby the download processor 23 decrypts the download request with the common key A selected by the device authenticator 22. In the case where a device ID included in the decrypted download request matches a device ID stored in the registered device ID 61 of the memory 6, the download processor 23 discriminates the software defined radio device 1 that sent the download request as an authorized device. Then, the download processor 23 calculates a hash value with a hash function from the software data requested by the software defined radio device 1. Then, the download processor 23 creates download data by encrypting the requested software data, the calculated hash value, and the device ID included in the download request with the common key A and sends the created download data to the software defined radio device 1.

Figure 3:
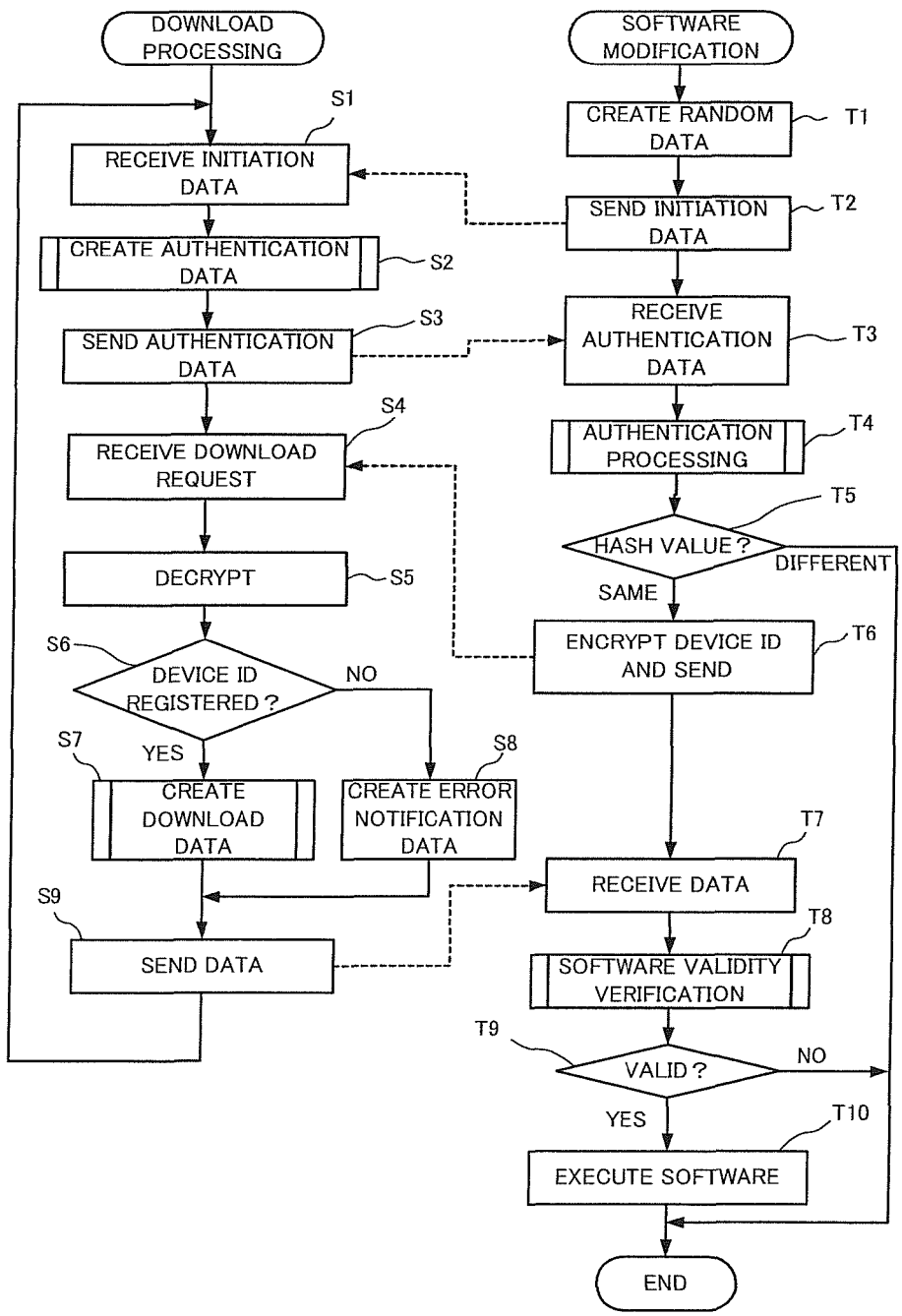
FIG. 3 is a flowchart illustrating an example of an operation of the software defined radio system according to the first exemplary embodiment of the present invention.

Next, an operation of the software defined radio system 10 according to the first exemplary embodiment of the present invention will be described. FIG. 3 is a flowchart illustrating an example of an operation of a software download for the software defined radio system 10 according to the first exemplary embodiment. A software modification of the right column of FIG. 3 illustrates an operation of the software defined radio device 1. A download processing of the left column thereof illustrates an operation of the download server 2.

The software defined radio device 1 initiates a processing of the software modification, whereby the authenticator 12 of the control circuit 11 creates arbitrary data, which in this example is a random number (step T1), and sends initiation data including the random number to the download server 2 (step T2).

Figure 4A:
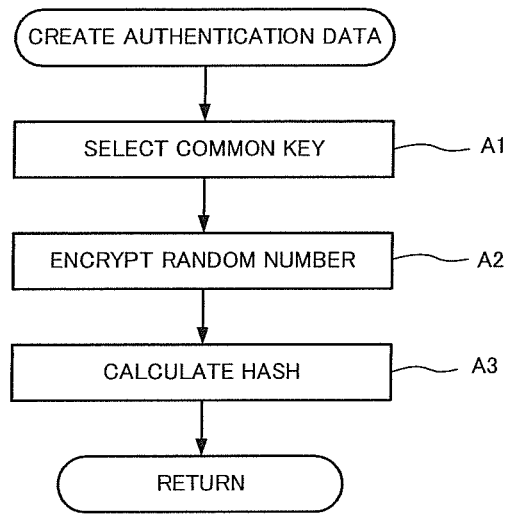
FIG. 4A is a flowchart illustrating an example of an operation of an authentication data creation processing.

The device authenticator 22 of the download server 2 receives the initiation data sent by the software defined radio device 1 (step S1) and creates authentication data (step S2). FIG. 4A is a flowchart illustrating an example of an operation of the authentication data creation processing.

The device authenticator 22 arbitrarily selects any common key (referred to in this example as "common key A") from the common key data 62 for encrypting data for communication with the software defined radio device 1, and determines a key parameter (number) corresponding to the common key A (step A1). The device authenticator 22 encrypts the random number included in the initiation data with the common key A (step A2). Then, a hash value is calculated with the predetermined hash function from the encrypted data (step A3). Thus, the authentication data comprises the hash value and the key parameter corresponding to the common key A.

Returning to the flowchart of FIG. 3, the device authenticator 22 sends the authentication data to the software defined radio device 1 (step S3).

Figure 4B:
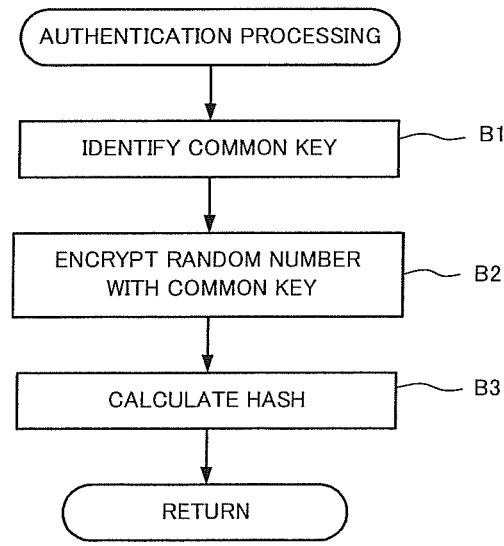
FIG. 4B is a flowchart illustrating an example of an operation of an authentication processing.

The software defined radio device 1 receives the authentication data (step T3) and performs an authentication processing (step T4). FIG. 4B illustrates an example of an operation of the authentication processing. The authenticator 12 of the control circuit 11 identifies the common key A from the common key data 52 stored in the memory 5 based on the key parameter included in the authentication data (step B1). The software defined radio device 1 then encrypts the random number that the software defined radio device sent to the download server 2 in step T2 with the common key A (step B2). The authenticator 12 calculates a hash value with the same hash function as that of the download server 2 from the encrypted random number (step B3).

Returning to the flowchart of FIG. 3, the authenticator 12 compares the hash value calculated in the authentication processing (step T4) with the hash value included in the authentication data (step T5). In the case where the two hash values are different (step T5: DIFFERENT), the software download processing ends. In the case where the two hash values are the same (step T5: SAME), the download processor 13 encrypts the device ID 51 with the common key A and sends a download request, including information for indicating the software to be requested to the download server 2 and the encrypted device ID 51, to the download server 2 (step T6). In such a case, a list of software downloadable by the software defined radio device 1 may be sent in advance to the software defined radio device 1 by the download server 2. The software defined radio device 1 may select software to be downloaded from the list, add the device ID 51 to the information, encrypt the information with the common key A, and send the encrypted data to the download server 2 as the download request.

The download server 2 receives the download request (step S4). Then, the download processor 23 decrypts the encrypted device ID included in the download request with the common key A selected by the device authenticator 22 (step S5). The download processor 23 discriminates whether or not the decrypted device ID is included in the registered device ID 61 stored in the memory 6 (step S6). In the case where the decrypted device ID is not included (step S6: NO), error notification data is created (step S8).

Figure 4C:
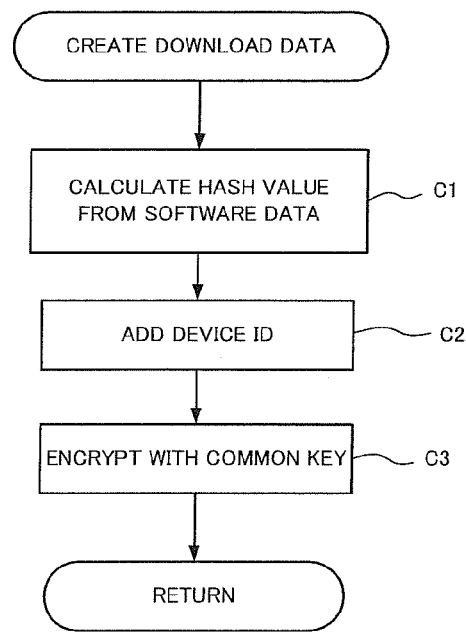
FIG. 4C is a flowchart illustrating an example of an operation of a download data creation processing.

In the case where the decrypted device ID is included in the registered device ID 61 (step S6: YES), the download processor 23 creates download data (step S7). FIG. 4C illustrates an example of an operation of a download data creation processing. The download processor 23 reads the software requested by the software defined radio device 1 from the software DB 63 and calculates a hash value with the hash function from the read software data (step C1). The download processor 23 adds the device ID 51 included in the download request to the requested software and the calculated hash value (step C2). Then, the download processor 23 encrypts the requested software, the calculated hash value, and the device ID 51 with the common key A, thereby creating the download data (step C3).

Returning to FIG. 3, the download processor 23 sends either the created download data (step S7) or the error notification data (step S8) to the software defined radio device 1 (step S9). The software defined radio device 1 receives the data (step T7) and then verifies the validity of the software (step T8).

Figure 4D:
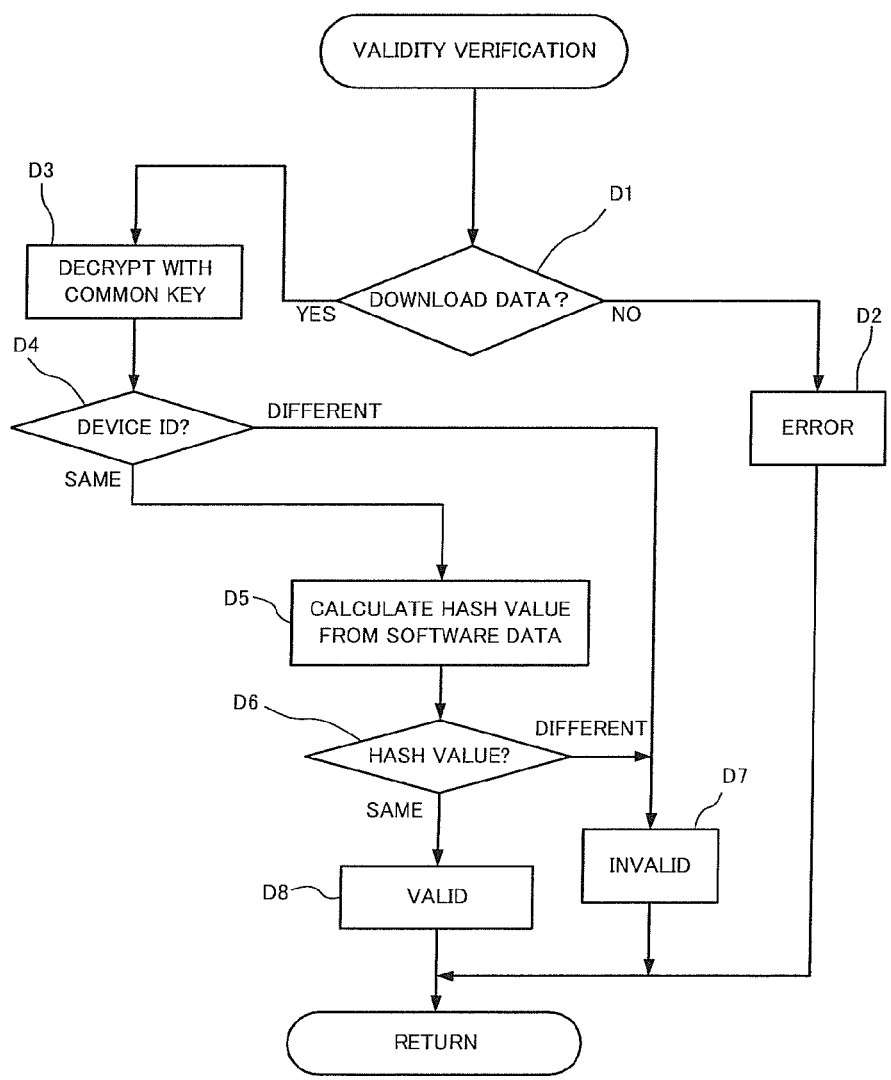
FIG. 4D is a flowchart illustrating an example of an operation of a software validity verification.

FIG. 4D illustrates an example of an operation of the software validity verification. First, the software verifier 14 determines whether or not the received data is the download data (step D1). In the case where the received data is not the download data (step D1: NO), i.e., the case where error notification data is received, the software verifier 14 sets an indicator that an error notification was received (step D2), and the verification of the validity of the software ends.

In the case where the received data is the download data (step D1: YES), the software verifier 14 decrypts the download data with the common key A (step D3). The software verifier 14 compares the decrypted device ID with the device ID 51 stored in the memory 5 (step D4). In the case where the two device ID do not match (step D4: DIFFERENT), an indicator is set that the download data is not valid, i.e., invalid (step D7), and the verification of the validity of the software ends.

In the case where the device ID match (step D4: SAME), the software verifier 14 calculates a hash value with the same hash function as that of the download server 2 from the software data (step D5). In the case where the hash value included in the download data differs from the calculated hash value (step D6: DIFFERENT), the software verifier 14 sets an indicator to indicate the invalidity (step D7), and the verification of the validity of the software ends. In the case where the two hash values are the same (step D6: SAME), the software verifier 14 discriminates the software as being unaltered, sets an indicator of the validity of the download data (step D8), and the verification of the validity of the software ends.

Returning to FIG. 3, in the case where, as a result of the software validity verification, the software verifier 14 has set an indicator that the download data is valid (step T9: YES), the control circuit 11 stores the decrypted software in the software data 53 of the memory 5. Then, the software executer 15 executes the stored software, thereby programming the signal processing circuit 16 and thus modifying the communication method of the software defined radio device 1 (step T10). In the case where the result of the software validity verification is other than valid (step T9: NO), the software data is not executed, and the software modification processing ends.

Thus, according to the first exemplary embodiment, both the software defined radio device 1 and the download server 2 possess a plurality of common keys. Furthermore, upon each download request, the download server 2 selects at random a common key and informs only the number thereof to the software defined radio device 1, thereby reducing the risk of a common key being compromised. According to such a configuration, a third party cannot impersonate either one of the download server 2 and the software defined radio device 1 without possessing knowledge of both the software defined radio device 1 and the download server 2.

For example, even in the case where one of the common keys is compromised, the download server 2 can prevent interception or alteration of the software by prohibiting use of the compromised common key. For the software defined radio system 10, encryption and decryption of data are performed using common keys, and therefore the software defined radio device 1 is able to securely realize the verification of the validity of the download server 2 and the guarantee of the confidentiality and security of the software with a smaller amount of processing than that of a public key encryption.

Furthermore, according to the first exemplary embodiment, the software defined radio device 1 can perform the verification of the validity of the download server 2 and also can guarantee the confidentiality and the security of the software only by using a common key encryption having low processing requirements, thereby enabling high speed modifications of the communication method even in the case where the software defined radio device 1 has a low processing capacity.

By this configuration, the software defined radio device 1 can download software sent by a download server 2 of confirmed validity while maintaining confidentiality. Moreover, a common key encryption, having smaller processing requirements than that of a public key encryption, can reduce the amount of processing by the software defined radio device 1.

[Second Exemplary Embodiment]

Now, a second exemplary embodiment is described, wherein an example of a system for verifying the validity of a download server requires a small amount of processing by a software defined radio device and yet improves security by using a public key encryption.

Figure 5:
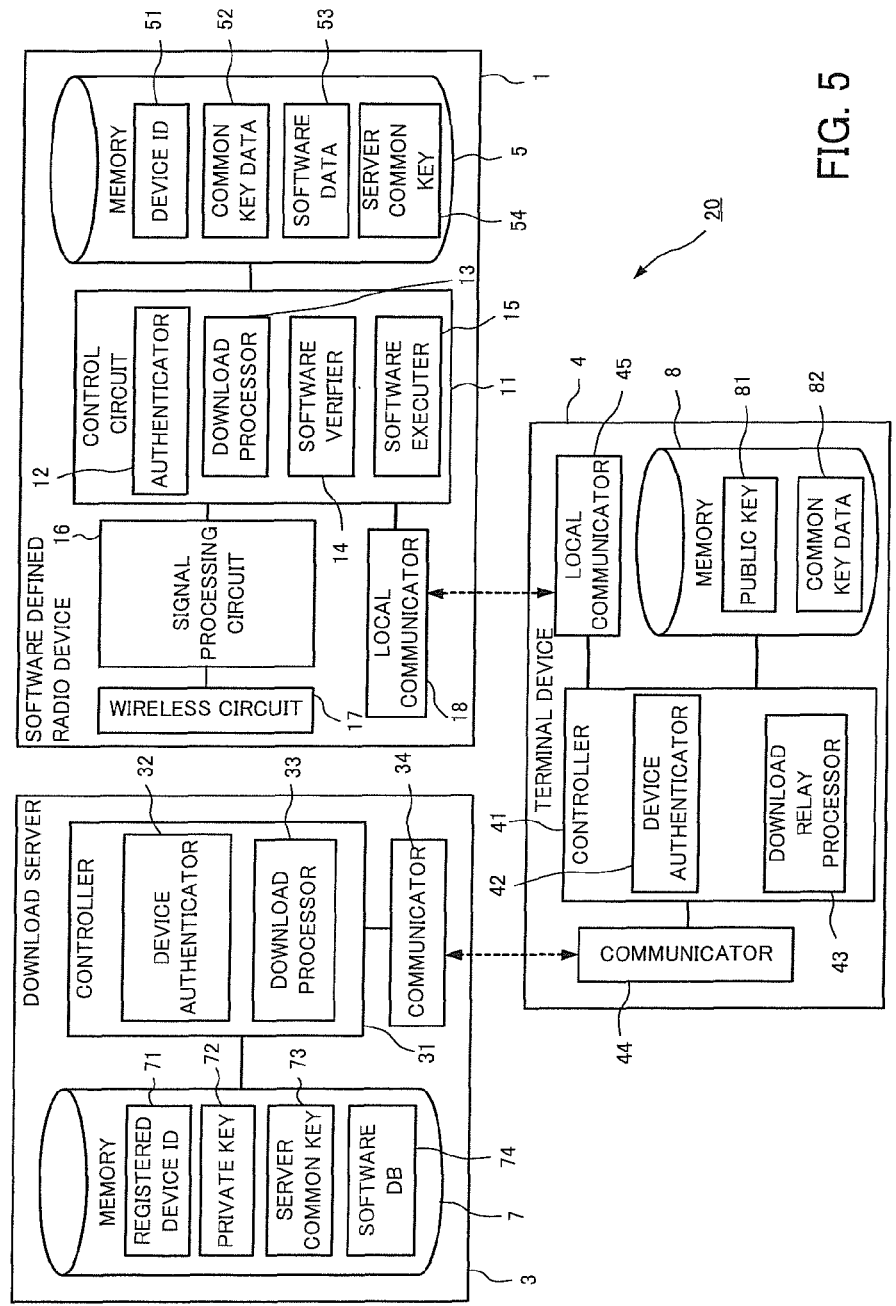
FIG. 5 is a block diagram illustrating an example of a configuration of a software defined radio system according to a second exemplary embodiment of the present invention.

FIG. 5 is a block diagram illustrating an example of a configuration of a software defined radio system 20 according to the second exemplary embodiment of the present invention. The software defined radio system 20 illustrated in FIG. 5 includes a terminal device 4 for relaying download communications between the software defined radio device 1 and a download server 3. Only one software defined radio device 1 and only one terminal device 4 are illustrated in FIG. 5 as typifying devices. The software defined radio system 20 may include multiple software defined radio devices 1 and multiple terminal devices 4 having similar configurations, respectively. In FIG. 5, components similar to those of FIG. 1 are given the same reference numerals.

In addition to the configuration of the software defined radio device 1 according to the first exemplary embodiment, the software defined radio device 1 of the second exemplary embodiment includes a local communicator 18. The local communicator 18 includes communication interface capabilities such as serial communication, USB (Universal Serial Bus), LAN (Local Area Network), or wireless LAN, and communicates therethrough with the terminal device 4. Communications of the authenticator 12 and the download processor 13 are made with the terminal device 4 via the local communicator 18.

The memory 5 stores a device ID 51, a common key data 52, a software data 53, and a server common key 54 for storing common keys of a plurality of servers to enable a verification of the download server 3 and encrypted communication. The common key data 52 has a configuration similar to that of the first exemplary embodiment, but the common key data 52 can be used for encrypting and decrypting data communicated to and from the terminal device 4. The device ID 51 may be data encrypted in advance with the server common key 54.

The authenticator 12 according to the second exemplary embodiment performs a similar processing as that of the first exemplary embodiment, and additionally communicates with the terminal device 4, performs a verification of the terminal device 4, and identifies a common key (referred to in this example as "common key B").

The download processor 13 creates a download request by further encrypting the device ID 51, already encrypted with the server common key 54, with the common key B identified by the authenticator 12 by a method similar to that of the first exemplary embodiment, and sends the download request to the terminal device 4 via the local communicator 18. Furthermore, the download processor 13 receives download data from the terminal device 4.

The software verifier 14 decrypts the download data with the common key B, and then decrypts the resulting decrypted download data with the server common key 54. In the case where the device ID included in the decrypted data matches the device ID 51 stored in the memory 5, the software verifier 14 discriminates the software included in the download data as the requested software. Then, the software verifier 14 calculates a hash value with a predetermined hash function from the decrypted data of the software and compares the calculated hash value with the hash value included in the decrypted data. In the case where the two hash values match, the software verifier 14 discriminates the software as not being altered or otherwise corrupted improper data. The software executer 15 is similar to that of the first exemplary embodiment.

The terminal device 4 includes a controller 41, a communicator 44, a memory 8, and a local communicator 45. The controller 41 may include devices such as a CPU, a main storage device, and an input/output device; execute a program loaded into the main storage device; and thereby perform processing for relaying download communications between the software defined radio device 1 and the download server 3. The communicator 44 sends and receives data by communicating with a communicator 34 of the download server 3 via a network such as the internet or a private network.

The memory 8 may include non-volatile memory such as flash memory, hard disk drive media, DVD-RAM (Digital Versatile Disc-Random Access Memory), and DVD-RW (Digital Versatile Disc-Rewritable), and stores a public key 81 and a common key data 82.

The public key 81 is used to encrypt data sent to the download server 3. Additionally, the validity of the download server 3 is verified by decrypting the electronic signature attached to the data transmitted by the download server 3 with the public key 81.

The common key data 82 includes a plurality of common keys used for performing verification of the software defined radio device 1 and encrypted communication as well as numbers or reference information for identifying each of the common keys. The common key data 82 is similar to the common key data 62 stored in the memory 6 of the download server 2 according to the first exemplary embodiment.

The local communicator 45 includes communication interface capabilities such as serial communication, Universal Serial Bus (USB), local area network (LAN), and wireless LAN, and communicates therethrough with the software defined radio device 1 via a communication network. The communicator 44 may be included as a portion of the local communicator 45.

The controller 41 includes a device authenticator 42 and a download relay processor 43. The device authenticator 42 and the download relay processor 43 may be realized by devices of the controller 41 such as a CPU, a main storage device, and an input/output device.

The device authenticator 42 receives the initiation data from the software defined radio device 1; creates arbitrary data such as a random number; uses the random number to select any common key B from the common key data 82; and determines a key parameter (number) corresponding to the common key B. The device authenticator 42 encrypts the arbitrary data included in the initiation data with the selected common key B and calculates a hash value with the predetermined hash function from the encrypted arbitrary data. The device authenticator 42 creates authentication data including the calculated hash value and the key parameter corresponding to the common key B and sends the authentication data to the software defined radio device 1 that sent the initiation data.

When the download relay processor 43 receives the download request from the software defined radio device 1, the download relay processor 43 decrypts the download request with the selected common key B selected by the device authenticator 42. Identification relay data is created by encrypting the decrypted data with the public key 81 stored in the memory 8. The identification relay data is sent to the download server 3 via the communicator 44.

When the download relay processor 43 receives data including download source data having an electronic signature attached from the download server 3, the download relay processor 43 verifies the electronic signature included in the data received from the download server 3 with the public key 81 stored in the memory 8. Then, in the case where it is determined that the data received from the download server 3 is correct, the download source data is encrypted with the selected common key B, and the resulting download data is sent to the software defined radio device 1 via the local communicator 45.

The download server 3 includes a controller 31, the communicator 34, and a memory 7. The controller 31 may include devices such as a CPU, a main storage device, and an input/output device; execute a program loaded into the main storage device; and thereby perform processing for sending software data to the software defined radio device 1. The communicator 34 communicates with the communicator 44 of the terminal device 4 via a communication network and sends and receives data.

The memory 7 may include non-volatile memory such as flash memory, hard disk drive media, DVD-RAM (Digital Versatile Disc-Random Access Memory), and DVD-RW (Digital Versatile Disc-Rewritable), and stores a registered device ID 71, a private key 72, a server common key 73, and a software DB (database) 74.

An identification code of the software defined radio device 1 of the software defined radio system 20 is stored in the registered device ID 71. For the software defined radio system 20, a software defined radio device 1 having a device ID stored in the registered device ID 71 is authorized to download software from the download server 3. A software defined radio device 1 having no device ID registered in the registered device ID 71 is not authorized to download software from the download server 3.

The private key 72 is used for decrypting the data received from the terminal device 4. The private key 72 is used also to attach an electronic signature to the download data. The server common key 73 is used for performing the verification of the software defined radio device 1 and encrypted communication.

Similarly to the first exemplary embodiment, one or more software components may be stored in the software DB 74 for realizing wireless communication function of the software defined radio device 1. Downloadable software is coupled to a device ID and stored in the software DB 74 for each of the software defined radio devices 1 or each group of multiple software defined radio devices 1. Furthermore, the hash value calculated with the hash function from data of the software may be stored together with the software in the software DB 74. The registered device ID 71 may be included as a portion of the software DB 74. Information regarding the downloadable software may include information having a worth equivalent to or exceeding that of the software itself.

The controller 31 includes a device authenticator 32 and a download processor 33. The device authenticator 32 and the download processor 33 may be realized by the devices included in the controller 31 such as a CPU, a main storage device, an input/output device, and programs controlled thereby.

The device authenticator 32 decrypts the identification relay data received from the terminal device 4 with the private key 72 and further performs a decryption with the server common key 73. In the case where the decrypted device ID is stored in the registered device ID 71, the download processor 33 performs a download processing of the software requested by the software defined radio device 1.

In the case where the device ID 51 of the software defined radio device 1 is stored in the registered device ID 71, the download processor 33 reads the software to be sent to the software defined radio device 1 from the software DB 74 and calculates a hash value with the predetermined hash function from data of the software. Then, download data is created by encrypting the software, the calculated hash value, and the device ID with the server common key 73; an electronic signature is attached to the download data with the private key 72; and the download data having the attached electronic signature is sent to the terminal device 4 via the communicator 34.

Figure 6:
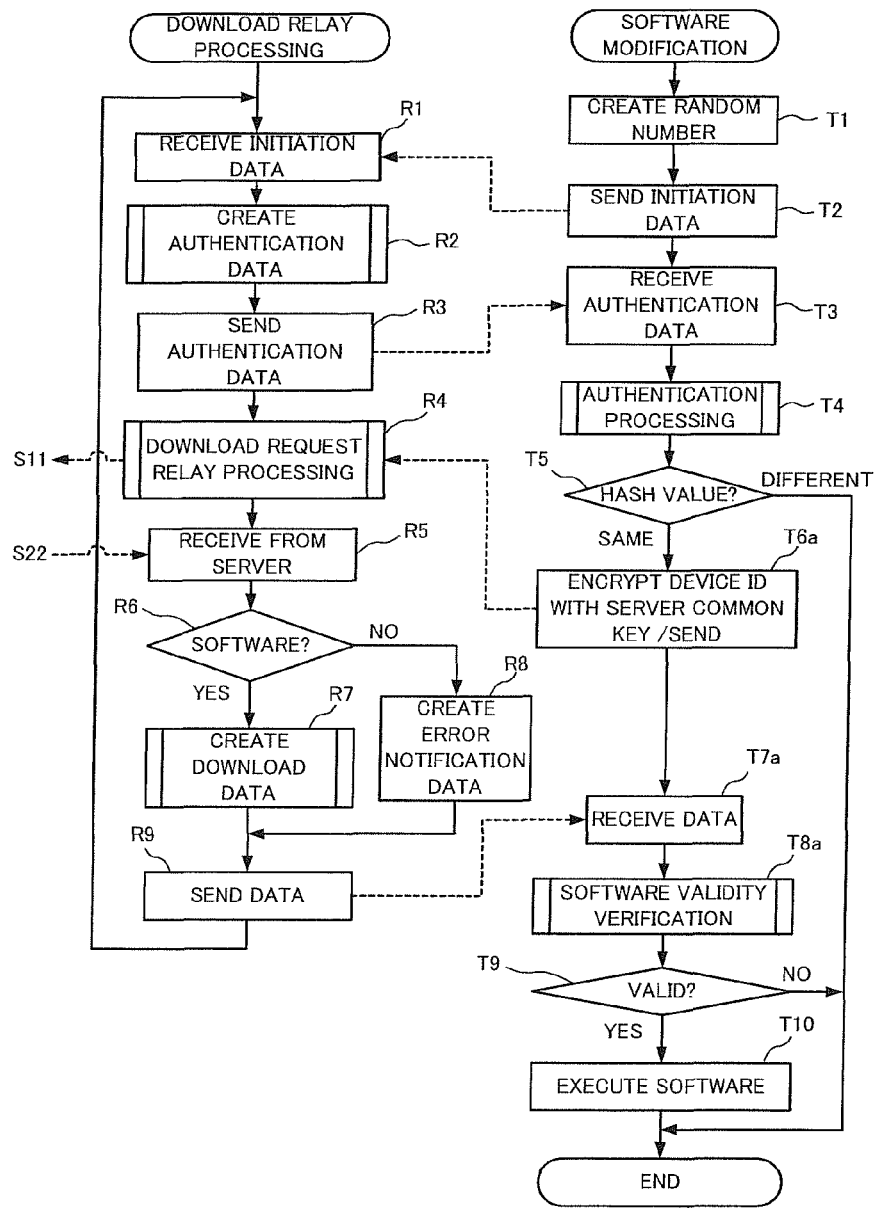
FIG. 6 is a flowchart illustrating an example of an operation of the software defined radio device and a terminal device according to the second exemplary embodiment of the present invention.
Figure 7:
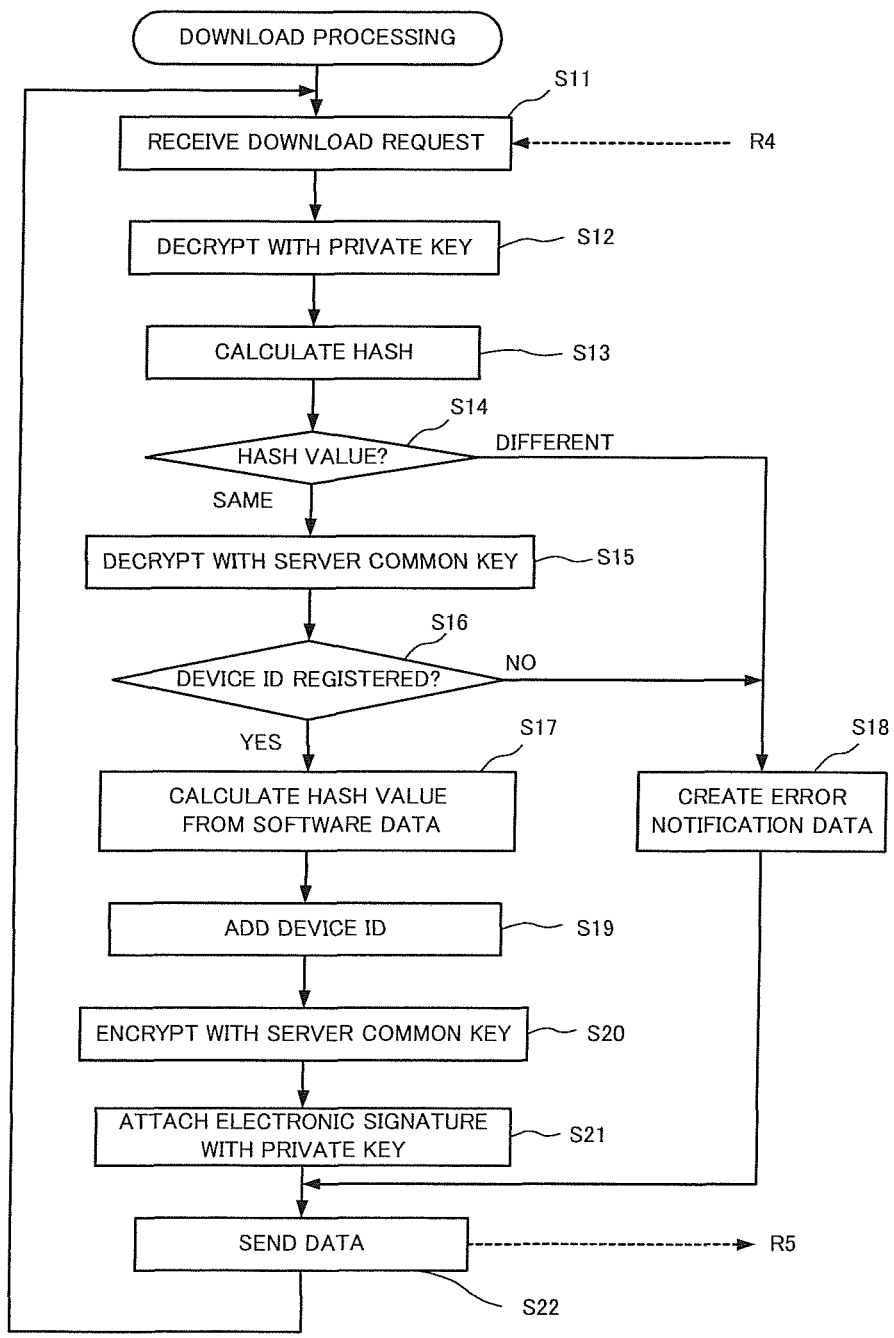
FIG. 7 is a flowchart illustrating an example of an operation of a download server according to the second exemplary embodiment of the present invention.

Next, an operation of the software defined radio system 20 according to the second exemplary embodiment will be described. FIG. 6 through FIG. 8C are flowcharts illustrating examples of operations of a software download of the software defined radio system 20 according to the second exemplary embodiment. FIG. 6 illustrates an example of an operation of the software defined radio device 1 and the terminal device 4. FIG. 7 illustrates an example of an operation of the download server 3.

The software modification of the right column illustrated in FIG. 6 illustrates an operation of the software defined radio device 1. The download relay processing of the left column illustrates an operation of the terminal device 4. In FIG. 6 and FIG. 7, steps similar to those of the flowchart of FIG. 3 are given the same reference numerals. The steps for the start of the download processing of the software (step T1) through the authentication processing by the software defined radio device 1 (step T4) and the comparison of the hash values (step T5) are similar to those of the first exemplary embodiment. The software defined radio device 1 according to the second exemplary embodiment sends initiation data to the terminal device 4 and receives authentication data from the terminal device 4. The steps for the reception of the initiation data by the terminal device 4 (step R1) through the sending of the authentication data (step R3) are similar to the operations of steps S1 through S3 by the download server 2 according to the first exemplary embodiment. Now, selections of a common key, referred to as "common key B," by the software defined radio device 1 and the terminal device 4 are described.

The authenticator 12 of the software defined radio device 1 compares the hash value calculated in the authentication processing (step T4) with the hash value included in the authentication data (step T5). In the case where the two hash values are different (step T5: DIFFERENT), the software download processing ends. In the case where the two hash values are the same (step T5: SAME), the authenticator 12 determines the terminal device 4 to be a correct communication entity, and therefore the download processor 13 creates a download request by encrypting the device ID 51 with the server common key 54, further encrypting the resulting encrypted data with the common key B, and then sends the download request to the terminal device 4 (step T6a).

Figure 8A:
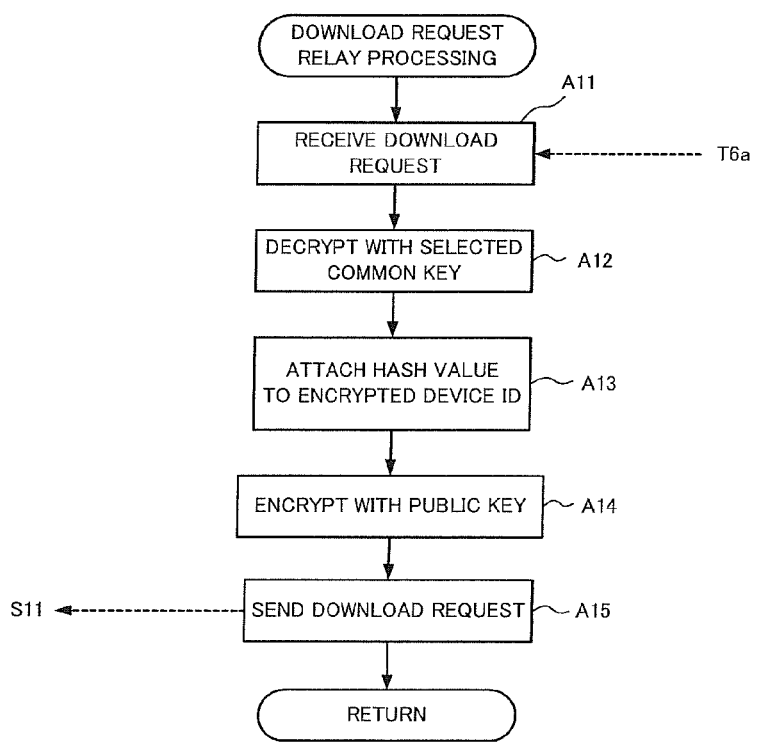
FIG. 8A is a flowchart illustrating an example of an operation of a download request relay processing.

The terminal device 4 receives the download request and then performs a download request relay processing (step R4). FIG. 8A illustrates an example of an operation of the download request relay processing. The download relay processor 43 of the terminal device 4 receives the download request (step A11) and then decrypts the download request with the common key B (step A12). The download relay processor 43 creates identification relay data by encrypting, with the public key 81 stored in the memory 8, the decrypted data (the device ID 51 encrypted with the server common key 54), and a hash value calculated with the same hash function as that of the download server 3 from the decrypted data (step A14). Then, the download relay processor 43 sends the identification relay data to the download server 3 (step A15). In such a case, a list of software downloadable by the software defined radio device 1 may be sent in advance to the terminal device 4 by the download server 3. The terminal device 4 may: combine information identifying software from the list to be downloaded, the decrypted data (the device ID 51 encrypted with the server common key 54), and a hash value calculated with the same hash function as that of the download server 3; create identification relay data by encrypting the combined data with the common key B; and then send the identification relay data to the download server 3.

FIG. 7 illustrates a flowchart of the download request relay processing (step R4) illustrated in FIG. 6. The device authenticator 32 of download server 3 receives the download request as the identification relay data (step S11) and then decrypts the received data with the private key 72 (step S12). A hash value is calculated with the same hash function as that of the terminal device 4 from the device ID (encrypted with the server common key 54) and included in the decrypted data (step S13).

In the case where the calculated hash value is different from the hash value included in the decrypted data (step S14: DIFFERENT), the device authenticator 32 determines the data to be improper data and therefore creates error notification data (step S18). In the case where the two hash values are the same (step S14: SAME), the device ID is decrypted with the server common key 73 (step S15). The device authenticator 32 discriminates whether or not the decrypted device ID is stored in the registered device ID 71 of the memory 7 (step S16). In the case where the device ID is not stored in the registered device ID 71 (step S16: NO), error notification data is created (step S18).

In the case where the device ID is stored in the registered device ID 71 (step S16: YES), the download processor 33 calculates a hash value with the same hash function as that of the software defined radio device 1 from the software data requested by the software defined radio device 1 (step S17). Then, the device ID included in the download request is added to the software and the hash value (step S19). Then, the download processor 33 encrypts the software, the hash value, and the device ID with the server common key 73 (step S20). Furthermore, the download processor 33 completes the download data by attaching an electronic signature with the private key 72 (step S21).

The download processor 33 sends the resulting download data from step S21 or the error notification data (step S18) to the terminal device 4 (step S22).

Returning to FIG. 6, the terminal device 4 receives the data from the download server 3 (step R5) and then discriminates whether or not the received data includes software (step R6). In the case where the data does not include software, for example, for error notification data (step R6: NO), error notification data is created (step R8). In the case where the received data includes software (step R6: YES), the download relay processor 43 creates download data to be sent to the software defined radio device 1 (step R7).

Figure 8B:
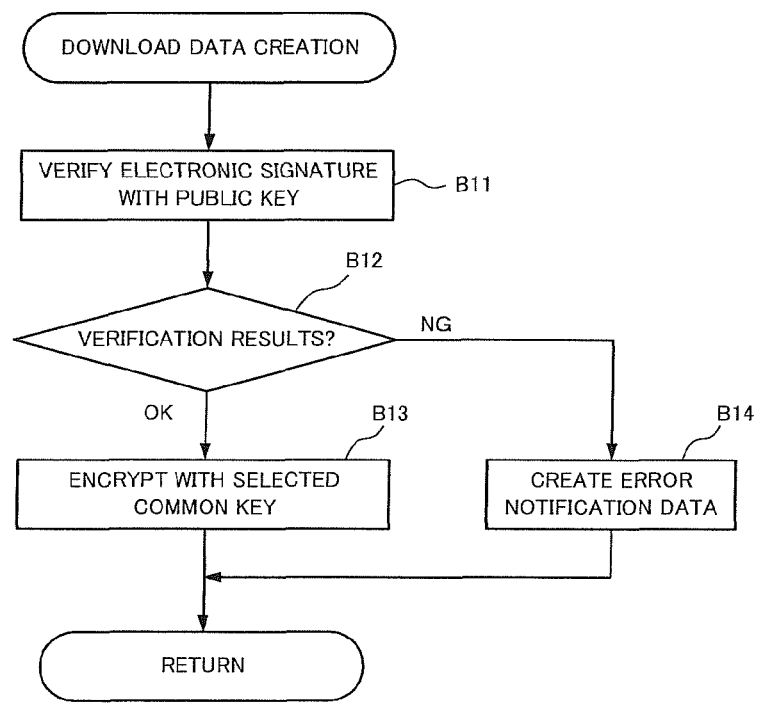
FIG. 8B is a flowchart illustrating an example of an operation of a download data creation processing.

FIG. 8B is a flowchart illustrating an example of an operation of a download data creation processing. The download relay processor 43 discriminates the validity of the electronic signature included in the received data with the public key 81 stored in the memory 8 (step B11). In the case where the download server 3 is discriminated as valid (step B12: OK), the download relay processor 43 creates download data by encrypting with the common key B (step B13). In the case where the result of the discrimination of the validity of the electronic signature indicates that the download server 3 is not valid (step B12: NG), the download relay processor 43 creates error notification data (step B14).

Returning to FIG. 6, the download relay processor 43 sends the created download data (step B13) or the error notification data (step R8 or step B14) to the software defined radio device 1 (step R9).

The software defined radio device 1 receives the data from the terminal device 4 (step T7a) and then verifies the validity of the software (step T8a).

Figure 8C:
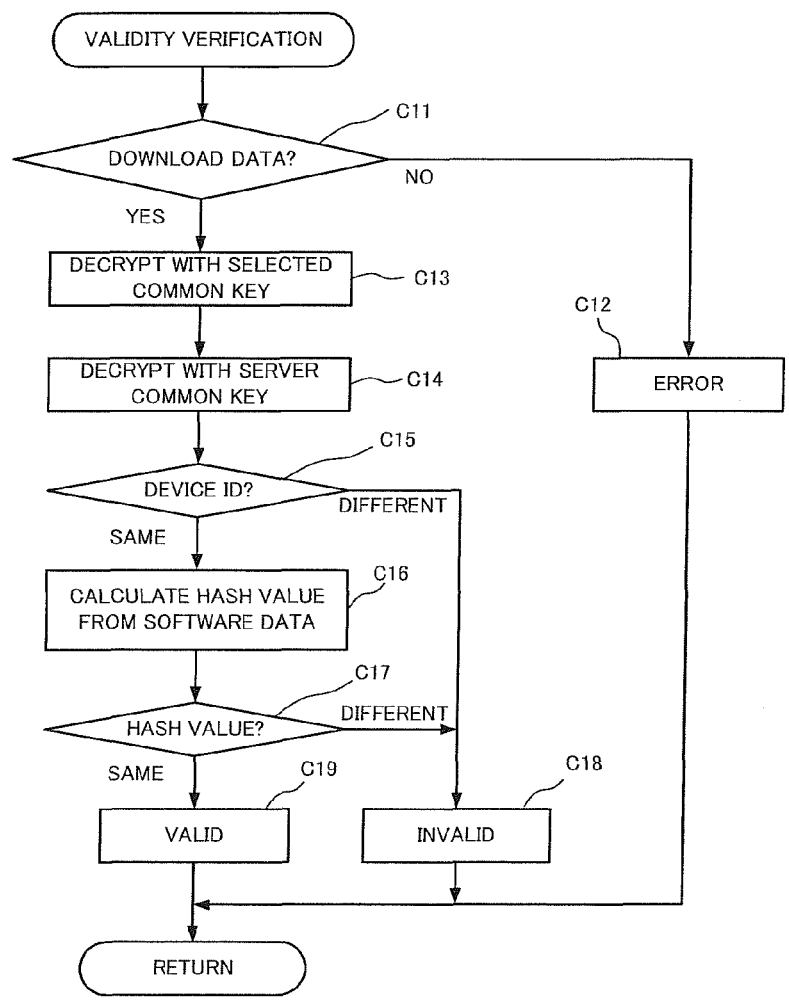
FIG. 8C is a flowchart illustrating an example of an operation of a software validity verification.

FIG. 8C illustrates an example of an operation of a software validity verification. First, the software verifier 14 discriminates whether or not the received data is download data (step C11). In the case where the received data is not download data (step C11: NO), i.e., the data is error notification data, the software verifier 14 sets an indicator to indicate that an error notification was received (step C12), and the software validity verification ends.

In the case where the received data is download data (step C11: YES), the software verifier 14 decrypts the download data with the common key B (step C13), and further performs a decryption with the server common key 54 (step C14). Then, the software verifier 14 compares the decrypted device ID with the device ID 51 stored in the memory 5 (step C15). In the case where the two device ID are different (step C15:

DIFFERENT), the software verifier 14 sets an indicator that the download data is not valid, i.e., invalid (step C18), and the software validity verification ends.

In the case where the two device ID match (step C15: SAME), the software verifier 14 calculates a hash value with the same hash function as that of the download server 3 from the data of the software (step C16). In the case where the hash value included in the download data and the calculated hash value are different (step C17: DIFFERENT), an indicator is set to indicate the invalidity (step C18), and the software validity verification ends. In the case where the two hash values are the same (step C17: SAME), the software verifier 14 discriminates the software as unaltered software, and sets an indicator that the download data is valid (step C19); and the software validity verification ends.

Returning to FIG. 6, in the case where the result of the software validity verification is valid (step T9: YES), the software executer 15 stores the decrypted software in the software data 53 of the memory 5. Then, the software executer 15 executes the software data, thereby programming the signal processing circuit 16 and modifying the communication method (step T10). In the case where the result of the software validity verification is other than valid (step T9: NO), the flow ends without executing the software data.

Thus, according to the second exemplary embodiment of the present invention, this authentication method prevents the compromise of a common key and includes a terminal device 4 having a confirmed validity that performs the confirmation of the validity of the download server 3 using a public key encryption in place of a similar processing by the software defined radio device 1; and therefore the verification of the validity is performed with highly-secure public key encryption for the portion connecting to an open network, while the software defined radio device 1 uses a common key encryption to minimize the amount of processing.

[Modification of the Second Exemplary Embodiment]

Processing is described in the case where it is ascertained that a common key of a plurality of common keys is compromised. In this modification, the download server 3 sends a command to the terminal device 4 for prohibiting the use of a common key.

Figures 9, 10:
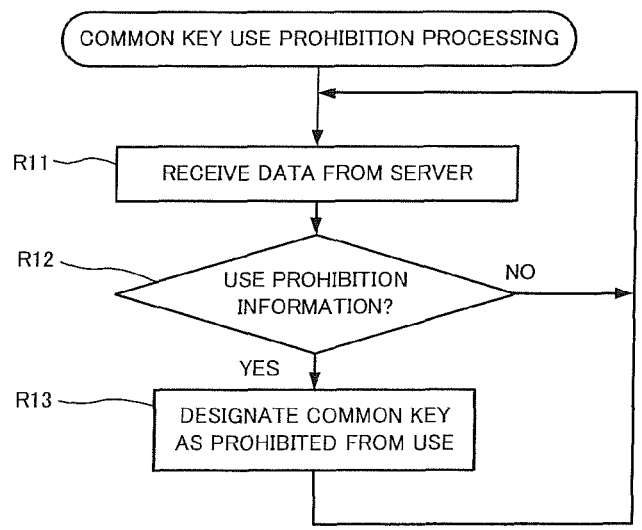
FIG. 9 illustrates an example of common key data of a terminal device.
FIG. 10 is a flowchart illustrating an example of an operation of a common key use prohibition processing.

FIG. 9 illustrates an example of common key data 82 of the terminal device 4. Data for indicating one of a use authorization and prohibition coupled to each of the common keys is stored in the common key data 82 of the terminal device 4. For example, the "x" symbol in the rightmost column of FIG. 9 represents that the use of the corresponding common key is prohibited.

FIG. 10 illustrates an example of an operation of a common key use prohibition processing. The device authenticator 42 receives data from the download server 3 (step R11) and then discriminates whether or not the data is common key use prohibition information by referencing the common key data 82 (step R12). In the case where the data is use prohibition information (step R12: YES), the device authenticator 42 designates the corresponding common key as being prohibited from use. In the case where the data is not use prohibition information (step R12: NO), no changes are made.

In the authentication data creation processing of the download relay processing, the selection of a common key is made from the common keys of the common key data 82 that are not prohibited from use. Thus, even in the case where a common key is compromised, the correct software can be securely downloaded.

As a first effect of the present invention, the software defined radio device 1 securely realizes the verification of the validity of the download server 3 and the guarantee of the confidentiality and the security of the software by using a common key encryption having less processing requirements than those of a public key encryption.

The reason for the first effect is that both the software defined radio device 1 and the download server 3 possess a plurality of common keys; a common key is selected at random for each download; a malicious third party is prevented from performing processing unless the third party possesses knowledge common thereto; and therefore it is difficult for a common key to be compromised. Moreover, even in the case where, for example, a key is compromised, the key may be designated as prohibited from use.

As a second effect of the present invention, a highly secure public key encryption is used for the verification of the validity by the portion connecting to an open network, and a common key encryption is used by the software defined radio device 1 to minimize the amount of processing.

The reason for the second effect is that the authentication method recited above uses a common key selected at random from a plurality of common keys and includes the terminal device 4 having a confirmed validity that confirms the validity of the download server 3 using a public key encryption in place of a similar processing by the software defined radio device 1.

As a third effect of the present invention, the amount of software authentication processing can be reduced for the software defined radio device 1, and therefore even in the case where the software defined radio device 1 has a small capacity, its software can be changed quickly. In other words, the communication method can be changed quickly.

The reason for the third effect is that even in the case where only a common key encryption having low processing requirements may be used by the software defined radio device 1, the system enables the verification of the validity of the download server 3 and the guarantee of the security and the confidentiality of the software.

Furthermore, the configurations of the hardware and the flowcharts recited above are but one example, and any modification or revision can be made.

The portion mainly responsible for performing the download processing, including devices such as the control circuit 11, the controllers 21, 31, and 41, the memories 5, 6, 7, and 8, the local communicators 18 and 45, and the communicators 34 and 44, need not be dedicated systems, and may be realized using a normal computer system. For example, a computer program for executing the operations recited above may be stored in a computer readable recording medium (such as flexible disk media, CD-ROM, DVD-ROM), distributed, and installed in a computer, thereby providing the software defined radio device 1, the download servers 2 and 3, and the terminal device 4 for executing the processing recited above. Alternatively, the computer program may be stored in a storage device of a server device in a communication network such as the internet, wherein the software defined radio device 1, the download servers 2 and 3, and the terminal device 4 may be provided by a download or similar transfer to a normal computer system or the like.

Furthermore, in configurations such as the case where the functions of the software defined radio device 1, the download servers 2 and 3, and the terminal device 4 are allotted between an OS (operating system) and an application program or realized by a cooperation between the OS and the application program, only the application program portion may be stored in a recording medium or a storage device.

Furthermore, the computer program may be superimposed on carrier waves and distributed via a communication network. For example, the computer program may be posted on a bulletin board (BBS, Bulletin Board System) in a communication network, and distributed via the network. Moreover, the computer program may be initiated and executed similarly to other application programs under the control of the OS, thereby performing the processing recited above.

The present invention is useful for a software defined radio device having a communication method modifiable by a software modification; and by an application for correctly downloading software, becomes industrially applicable.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A software defined radio device, comprising:
a storage unit for storing an identification code of the software defined radio device itself and a plurality of common keys for encrypting data and performing mutual communications with a communication entity, said plurality of common keys being commonly held by this software defined radio device and the communication entity;
a download initiation unit for sending data to the communication entity;
a common key identification unit for identifying one common key from the plurality of common keys based on data received from the communication entity which received the data;
a verification unit for encrypting the data sent to the communication entity with a common key identified by the common key identification unit and calculating a hash value with a hash function from the encrypted data;
a download request unit for encrypting data including the identification code with the common key identified by the common key identification unit and sending the encrypted data to the communication entity in the case where a hash value calculated by the verification unit matches a hash value included in data received from the communication entity;
a decryption unit for decrypting download data received from the communication entity with the common key identified by the common key identification unit;
a confirmation unit for calculating a hash value with a hash function from download data decrypted by the decryption unit in the case where an identification code included in the decrypted download data matches the identification code stored by the storage unit; and
a modification unit for using software data included in the decrypted download data to modify a communication function in the case where a hash value included in the decrypted download data matches a hash value calculated by the confirmation unit.

2. The software defined radio device according to claim 1, wherein:
the storage unit stores a second common key which is different from the plurality of common keys;
the download request unit encrypts data including the identification code with the second common key, subsequently encrypts the encrypted data with the common key identified by the common key identification unit, and sends the subsequently encrypted data to the communication entity; and the decryption unit decrypts the download data with the common key identified by the common key identification unit and subsequently further decrypts the decrypted download data with the second common key.

3. The software defined radio device, according to claim 1, wherein:
said download initiation unit send the data includes arbitrary data.

4. The software defined radio device, according to claim 3, wherein:
the arbitrary data comprises a generated random data.

5. The software defined radio device, according to claim 1, wherein:
said communication entity receives the data sent from said download initiation unit, selects one of the plurality of common keys, encrypts data included in the data received from said download initiation unit, and send data encrypted by the selected common key and identifying data identifying the selected common key to said software defined radio device from; and
said common key identification unit identifies one common key from the plurality of common keys based on the received identifying data.

6. The software defined radio device, according to claim 5, wherein:
said communication entity receives the encrypted data sent from said download request unit, decrypts the received data by the selected common key to obtain the identification code, check the decrypted identification code, and obtaining hash value of the software data, encrypts the download data including the software data, the hash value and the identification code, and send the encrypted data to the software defined radio device.

7. A method for renewing software of a software defined radio device, wherein:
the software defined radio device comprises a download initiation step of sending initiation data including data to a communication entity;
the communication entity receiving the initiation data comprises
a selection step of selecting one common key from a plurality of common keys for encrypting data and performing mutual communications, said plurality of common keys being commonly held by said software defined radio device and said communication entity, and
a common key designation step of sending a hash value calculated with a hash function from data made by encrypting the data sent to the communication entity from the software defined radio device included in the initiation data received from the software defined radio device with the selected common key and data for identifying the common key selected in the selection step to the software defined radio device that sent the initiation data;
the software defined radio device comprises
a common key identification step of identifying one common key from the plurality of common keys based on data received from the communication entity,
an authentication step of calculating a hash value with a hash function from data made by encrypting the data with the common key identified in the common key identification step, and
a download request step of sending identification data made by encrypting data including an identification code of the software defined radio device itself with a common key identified in the common key identification step to the communication entity in the case where a hash value calculated in the authentication step matches a hash value included in data received from the communication entity;

the communication entity comprises a download step of sending download data made by encrypting, with the selected common key, software data requested by the software defined radio device, a hash value calculated with a hash function from the software data, and an identification code made by decrypting identification data received from the software defined radio device with the selected common key to the software defined radio device in the case where the identification code made by decrypting the identification code matches one of a plurality of preregistered identification codes; and the software defined radio device comprises
  a decryption step of decrypting the download data received from the communication entity with the common key identified in the common key identification step,
  a confirmation step of calculating a hash value with a hash function from data decrypted in the decryption step in the case where an identification code included in the decrypted data matches the identification code of the software defined radio device, and
  a modification step of using software data included in the decrypted data to modify a communication function in the case where a hash value included in the decrypted data matches a hash value calculated in the confirmation step.

8. A method for renewing software of a software defined radio device, wherein the software defined radio device comprises a download initiation step of sending initiation data including data to a communication entity;

the communication entity receiving the initiation data comprises
  a selection step of selecting one common key from a plurality of common keys for encrypting data and performing mutual communications, said plurality of common keys being commonly held by said software defined radio device and said communication entity, and
  a common key designation step of sending a hash value calculated with a hash function from data made by encrypting the data included in the initiation data received from the software defined radio device with the selected common key and data for identifying the common key selected in the selection step to the software defined radio device that sent the initiation data;

the software defined radio device comprises
  a common key identification step of identifying one common key from the plurality of common keys based on data received from the communication entity,
  a verification step of calculating a hash value with a hash function from data made by encrypting the data sent to the communication entity from the software defined radio device with the common key identified in the common key identification step, and
  a download request step of sending identification data made by encrypting, with the common key identified in the common key identification step, data made by encrypting data including an identification code of the software defined radio device itself with a second common key which is different from the plurality of common keys to the communication entity in the case where a hash value calculated in the verification step matches a hash value included in data received from the communication entity;

the communication entity comprises a download request relay step of sending identification relay data made by encrypting, with a public key of a download server storing software data of the software defined radio device, data made by decrypting identification data received from the software defined radio device with the selected common key to the download server;

the download server comprises a relay download step of sending data made by attaching, with a private key, an electronic signature to download source data made by encrypting, with the second common key, software data requested by the software defined radio device, a hash value calculated with a hash function from the software data, and an identification code made by decrypting, with the second common key, data made by decrypting identification relay data received from the communication entity with the private key to the communication entity in the case where the identification code matches one of a plurality of preregistered identification codes;

the communication entity comprises a download step of verifying an electronic signature included in data received from the download server with the public key of the download server and sending download data made by encrypting the download source data with the selected common key to the software defined radio device in the case where the verification step determines that data received from the download server is correct; and the software defined radio device comprises
  a decryption step of decrypting, with the second common key, data made by decrypting the download data received from the communication entity with the common key identified in the common key identification step,
  a confirmation step of calculating a hash value with a hash function from data decrypted in the decryption step in the case where an identification code included in the decrypted data matches the identification code of the software defined radio device, and
  a modification step of using software data included in the decrypted data to modify a communication function in the case where a hash value included in the decrypted data matches a hash value calculated in the confirmation step.

9. A software defined radio system, including a software defined radio device having a communication function modifiable by a software modification and a download server for storing software data of the software defined radio device, wherein the software defined radio device comprises
  a storage unit for storing an identification code of the device itself and a plurality of common keys for encrypting data and performing mutual communications with the download server,
  a download initiation unit for sending initiation data including data to the download server,
  a common key identification unit for identifying one common key from the plurality of common keys based on data received from the download server,
  a verification unit for calculating a hash value with a hash function from data made by encrypting the data sent to the download server with a common key identified by the common key identification unit, a download request unit for sending identification data made by encrypting data including the identification code with the common key identified by the common key identification unit to the download server in the case where a hash value calculated by the verification unit matches a hash value included in data received from the download server, a decryption unit for decrypting download data received from the download server with the common key identified by the common key identification unit, a confirmation unit for calculating a hash value with a hash function from data decrypted by the decryption unit in the case where an identification code included in the decrypted data matches the identification code stored by the storage unit, and a modification unit for using software data included in the decrypted data to modify a communication function in the case where a hash value included in the decrypted data matches a hash value calculated by the confirmation unit; and the download server comprises a storing unit for storing the plurality of common keys for encrypting data, a selection unit for selecting one common key from the plurality of common keys stored in said storing unit and performing mutual communications with the software defined radio device, a common key designation unit for sending a hash value calculated with a hash function from data made by encrypting the data selected by the software defined radio device and received from the software defined radio device with the selected common key and data for identifying a common key selected by the selection unit to the software defined radio device that sent the initiation data, and a download unit for sending download data made by encrypting, with the selected common key, software data requested by the software defined radio device, a hash value calculated with a hash function from the software data, and an identification code made by decrypting identification data received from the software defined radio device with the selected common key to the software defined radio device in the case where the identification code matches one of a plurality of preregistered identification codes.

10. A software defined radio system including a software defined radio device having a communication function modifiable by a software modification, a download server for storing software data of the software defined radio device, and a terminal device for relaying communications between the software defined radio device and the download server, wherein the software defined radio device comprises a storage unit for storing an identification code of the software defined radio device itself and a plurality of common keys for encrypting data and performing mutual communications with the download server and a download initiation unit for sending initiation data including data to the download server;

the terminal device comprises a selection unit for storing the plurality of common keys for encrypting data, selecting one common key from the plurality of common keys for encrypting data and performing mutual communications with the software defined radio device and a common key designation unit for sending a hash value calculated with a hash function from data made by encrypting the data selected by the software defined radio device and received from the software defined radio device with the selected common key and data for identifying a common key selected by the selection unit to the software defined radio device that sent the initiation data;

the software defined radio device comprises a common key identification unit for identifying one common key from the plurality of common keys based on data received from the terminal device, a verification unit for calculating a hash value with a hash function from data made by encrypting the selected data sent to the download server with a common key identified by the common key identification unit, and a download request unit for sending identification data made by encrypting, with a common key identified by the common key identification unit, data made by encrypting data including the identification code with a second common key separate from the plurality of common keys to the terminal device in the case where a hash value calculated by the verification unit matches a hash value included in data received from the terminal device;

the terminal device comprises a download request relay unit for sending identification relay data made by decrypting, with a public key of the download server, data made by decrypting identification data received from the software defined radio device with the selected common key to the download server;

the download server comprises a relay download unit for sending data made by attaching, with a private key, an electronic signature to download source data made by encrypting, with a second common key separate from the plurality of common keys, software data requested by the software defined radio device, a hash value calculated with a hash function from the software data, and an identification code made by decrypting, with the second common key, data made by decrypting identification relay data received from the terminal device with the private key to the communication entity in the case where the identification code matches one of a plurality of preregistered identification codes;

the terminal device further comprises a download unit for verifying an electronic signature included in data received from the download server with a public key of the download server and sending download data made by encrypting the download source data with the selected common key to the software defined radio device in the case where the verification determines that data received from the download server is correct; and the software defined radio device further comprises a decryption unit for decrypting, with the second common key, data made by decrypting the download data received from the terminal device with the common key identified by the common key identification unit, a confirmation unit for calculating a hash value with a hash function from data decrypted by the decryption unit in the case where an identification code included in the decrypted data matches the identification code of the software defined radio device, and a modification unit for using software data included in the decrypted data to modify a communication function in the case where a hash value included in the decrypted data matches a hash value calculated by the confirmation unit.

11. A terminal device for relaying communications between a software defined radio device having a communication function modifiable by a software modification and a download server for storing software data of the software defined radio device, comprises:
   a selection unit for storing a plurality of common keys for encrypting data, selecting one common key from the plurality of common keys for encrypting data and performing mutual communications with the software defined radio device upon receiving initiation data for initializing a download of the software data from the software defined radio device;
   a common key designation unit for sending a hash value calculated with a hash function from data made by encrypting a predetermined portion of initiation data received from the software defined radio device with the selected common key and data for identifying a common key selected by the selection unit to the software defined radio device;
   a download request relay unit for sending data made by encrypting, with a public key of the download server, data made by decrypting identification data included in data received from the software defined radio device with the selected common key to the download server upon receiving data for requesting a download from the software defined radio device; and
   a download unit for verifying an electronic signature included in data received from the download server with the public key of the download server and sending download data made by encrypting data to be downloaded from the download server with the selected common key to the software defined radio device upon receiving the data to be downloaded in the case where the verification determines that data received from the download server is correct.

12. The terminal device according to claim 11, wherein said data common key exclusion unit for excluding, from a scope of the selection from the plurality of common keys, a common key in a scope of a command for prohibiting a use of one of the plurality of common keys in the case where a command for prohibiting the use is received from the download server, wherein
   the selection unit excludes, from the plurality of common keys, a common key in a scope of a command for prohibiting the use and selects one common key.

* * * * *